(12) United States Patent
Suzuki et al.

(10) Patent No.: US 6,400,052 B1
(45) Date of Patent: Jun. 4, 2002

(54) MOTOR AND ROTARY APPARATUS HAVING MOTOR

(75) Inventors: Takafumi Suzuki; Hiromitsu Goto, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/540,378

(22) Filed: Mar. 31, 2000

(30) Foreign Application Priority Data

Apr. 2, 1999 (JP) ............................................ 11-097020

(51) Int. Cl.[7] .............................. H02K 5/16; F16C 32/06
(52) U.S. Cl. ......................... 310/90; 384/100; 384/115; 384/120
(58) Field of Search ................................ 310/90, 67 R; 384/100, 105, 107, 112, 114, 115, 120, 123

(56) References Cited

U.S. PATENT DOCUMENTS

| | | | | |
|---|---|---|---|---|
| 4,552,417 A | * | 11/1985 | Yamashita et al. ............. | 308/10 |
| 4,783,608 A | * | 11/1988 | Bruber et al. .................. | 310/90 |
| 5,357,163 A | * | 10/1994 | Minakuchi et al. ............ | 310/90 |
| 5,659,445 A | * | 8/1997 | Yoshida et al. ........... | 360/98.07 |
| 5,821,654 A | * | 10/1998 | Woo .............................. | 310/90 |
| 5,822,846 A | * | 10/1998 | Moritan et al. ................ | 29/598 |
| 5,835,124 A | * | 11/1998 | Fukita et al. ................ | 347/260 |
| 5,998,898 A | * | 12/1999 | Fukutani et al. .............. | 310/90 |
| 6,200,033 B1 | * | 3/2001 | Takeuchi ..................... | 384/115 |

* cited by examiner

Primary Examiner—Nestor Ramirez
Assistant Examiner—Dang Dinh Le
(74) Attorney, Agent, or Firm—Adams & Wilks

(57) ABSTRACT

A motor has a support member, a bearing member mounted in a hollow space of the support member for undergoing rotation, a rotor member having a shaft portion disposed in a hollow space of the bearing member for rotation therewith, at least one magnet connected to one of the support member and the rotor member, and electromagnets connected to the other of the support member and the rotor member and in confronting relation to the magnet for generating a rotational magnetic field that coacts with the magnet to rotate the rotor member. At least one of an inner peripheral surface of the bearing member and an outer peripheral surface of the shaft portion of the rotor member has contact portions disposed in contact with the other of the inner peripheral surface and the outer peripheral surface to form lubricating gaps each disposed between an adjacent pair of contact portions and between the inner and outer peripheral surfaces.

19 Claims, 6 Drawing Sheets

MOTOR AND ROTARY APPARATUS HAVING MOTOR

BACKGROUND OF THE INVENTION

The present invention relates to a motor, to a method of fabricating a motor and to a rotary apparatus utilizing the motor capable of providing excellent rotational accuracy and high durability.

Conventionally, in a rotary apparatus such as a rotary polygonal face mirror of a laser beam printer or HDD (hard disk drive), there is used a motor using dynamic pressure bearings.

In the conventional rotary body apparatus, a rotor member needs to rotate at a high speed and at a rate of several thousands through several ten thousands rotations/minute, and by using the dynamic pressure bearings, members on the side of a rotor are supported in noncontact relation during high speed rotation to thereby restrain wear of the members.

A motor shown by FIG. 7 is an example of a motor using such dynamic pressure bearings. The motor shown by FIG. 7 is provided with a base 110 fixed to a frame of a main body apparatus such as printer or HDD, a hub shaft 130 extended with a shaft 131 in a shape of a circular cylinder from the center of a hub 132 in a circular plate shape and a bearing ring 152 fixedly attached to an end portion of the shaft 131.

The base 110 is provided with a fitting portion 110a projected in a circular ring shape and a stator coil 140 is fixed to an outer peripheral face of the fitting portion 110a.

A retaining ring 151 is fixed to a front end portion of the fitting portion 110a coaxially with the fitting portion.

The stator coil 140 comprises a sheet-like yoke 141 laminated with a single or a plurality of sheets having the same shape and coils 142 formed by winding lead wires at the yoke 141. The yoke 141 comprises a mounting portion in a circular ring shape and a plurality of winding portions extended from the mounting portion outwardly in the diameter direction and is fixed to the fitting portion 110a by inserting the fitting portion 110a into a hollow portion of the mounting portion. Coils 142 are formed by winding lead wires around the winding portions and a rotary magnetic field is formed by conducting electricity to the coils 142.

A circular ring portion 133 is extended from a peripheral edge portion of the hub 132 of the hub shaft 130 toward a lower direction and rotor magnets 160 are fixed to an inner peripheral wall of the circular ring portion 133.

A bearing ring 152 is coaxially fixed to the end portion of the shaft 131 of the hub shaft 130, the shaft 131 penetrates the retaining ring 151, the bearing ring 152 is rotatably arranged in the fitting portion 110a of the base 110 and the hub shaft 130 is rotatably supported by the base 110. Oil for lubrication is filled between the fitting portion 110a of the base 110 and the bearing ring 152.

Grooves for generating dynamic pressure are formed at an outer peripheral face and an upper and a lower end face of the bearing ring 152.

According to the motor of the conventional technology, the rotor magnets 160 fixed to the circular ring portion 133 of the hub shaft 130 are urged by the rotary magnetic field formed by the stator coil 140 and the hub shaft 130 is rotated. Further, in accordance with rotation of the hub shaft 130, the bearing ring 152 is rotated and the oil is drawn between the bearings ring 152 and the fitting portion 110a of the base 110 and between the bearing ring 152 and the retaining ring 151. Further, when the rotational number of the hub shaft 130 becomes equal to or larger than a predetermined rotational number, the bearing ring 152 is supported to float by the dynamic pressure.

The motor using such dynamic pressure bearings is provided with advantages in which wear among members is inconsiderable even in high speed rotation and excellent durability is achieved.

Now, according to the above-described motor, in the bearing ring 152, there is used a copper-series metal material and there is used a metal material of SUS for the base since the grooves for generating the dynamic pressure are easy to form and durability against wear to a degree of withstanding the use is provided. As other reason of using these materials, in a state in which temperature is elevated in rotating the motor, the linear expansion coefficient of the copper-series metal is larger than that of SUS, when a hollow portion of the inserting portion 110a of the base 110 is expanded, the bearing ring 152 is expanded more than the expansion of the hollow portion and a volume of a clearance between the fitting portion 110a and the bearing ring 152 is not varied considerably and accordingly, the generated dynamic pressure can be maintained constant regardless of temperature. Further, in the dynamic pressure bearing, it is necessary for generating predetermined dynamic pressure to maintain the clearance between the bearing ring 152 and the fitting portion 110a of the base 110 with accuracy of about ±1 micrometer.

Further, the bearing ring 152 is fixed to the shaft 131 of the hub shaft 130 by press fitting.

Further, the shaft 131 of the hub shaft 130 is formed in a circular cylinder shape since the shaft 131 is a rotary member and an inner vacant portion of the bearing ring 152 fixed to the shaft 131 is also formed in a circular cylinder shape. By influence of checking of a lathe, a section of either of an outer peripheral face of the shaft portion 131a and an inner peripheral face forming the inner vacant portion of the bearing ring 152, cannot be machined to a completely round shape (complete roundness) and actually, the section is machined to an irregular circle including the complete roundness.

When the shaft 131 having an outer peripheral face of the section in an irregular circular shape, is mounted to the inner vacant portion of the bering ring 152 similarly having an irregular circular section, the state in which all the faces are brought into contact with each other is not produced and in either of the circumferential direction and the axial direction, there is brought about a state in which contact portions and separated portions are irregularly arranged and there is produced portions where stress is concentrated in press fitting.

Further, a material which is easy to form the dynamic pressure generating grooves and having the large expansion coefficient, as mentioned above, is generally provided with low hardness and when the bearing ring 152 is formed by such a material and the bearing ring 152 is press-fitted to the shaft 132 of the hub shaft 130, the portions where stress is concentrated as mentioned above are liable to deform. When the bearing ring 152 is deformed in this way, it is difficult to generate and maintain the dynamic pressure having a predetermined magnitude, and therefore there poses a problem in which the rotational accuracy is deteriorated or there is a concern of wearing the bearing ring 152.

SUMMARY OF THE INVENTION

The present invention has been carried out in order to resolve the above-described problem and it is an object thereof to provide a motor capable of achieving excellent rotational accuracy and high durability, a method of fabricating the motor and a rotary apparatus utilizing the motor.

The present invention achieves the above-described object by providing a motor comprising a rotor member having a shaft portion, a bearing ring having an inner vacant portion, the inner portion being inserted with the shaft portion and fixed to the shaft portion, a supporting member having a hollow portion containing the bearing ring relatively rotatably, a plurality of electromagnets arranged to the supporting member coaxially and in a fixed state for generating a rotary magnetic field, rotor magnets fixed to the rotor member and urged by the rotary magnetic field generated by the electromagnets for rotating the rotor member and the bearing ring, and dynamic pressure generating means arranged at either of the bearing ring and the supporting member for generating dynamic pressure between either one of the bearing ring and the supporting member and other thereof, wherein at least one of an outer peripheral face portion of a fixing portion of the shaft portion to which the bearing ring of the shaft portion is fixed and an inner peripheral face of the bearing ring, includes contact portions projected linearly to other thereof and brought into contact with the other at three or more locations in a circumferential direction thereof and to separated portions are formed among the contact portions to separate and oppose with other portions.

According to the motor of the invention, at least either one of the inner peripheral face portion of the fixing portion of the shaft portion of the rotor member to which the bearing ring is fixed and the outer peripheral face portion of the bearing ring, is formed with the contact portions which are projected linearly and brought into contact with the other at the three or more locations in the circumferential direction.

The contact portions are formed by forming at least either one of the inner peripheral face portion of the fixing portion of the shaft portion of the rotor member to which the bearing ring is fixed and the outer peripheral face portion of the ring in a shape projected linearly at the three or more locations in the circumferential direction and inserting the shaft portion of the rotor member into the inner vacant portion of the bearing ring to thereby bring the contact portions into contact with an opposed member. When the contact portions are brought into contact with the opposed member in this way, the projected portions are pressed in accordance with the shape of the opposed member to widen toward unprojected portions to crush to deform in very small amounts, the machining error is corrected and the contact portions are formed by being brought into close contact with the opposed member with no clearance therebetween.

In this way, according to the invention, the contact portions are projected linearly and the separated portions are formed among the contact portions and accordingly, when the bearing ring is fixed to the shaft portion of the rotor member, the bearing ring or the shaft portion of the rotor member is pressed to the opposed member to deform into the shape in accordance with the opposed member thereby forming the contact portions. Further, the contact portions formed in this way are provided with the shape in accordance with the opposed member and are brought into close contact with the opposed member with certainty. Therefore, the contact portions of the shaft portion of the rotor member and the bearing ring can be controlled in accordance with positions of arranging the contact portions, stress by press fitting can be distributed with certainty at the contact potions, stress can be absorbed at the contact portions and deformation of the bearing ring can be avoided.

Further, the shaft portion of the rotor member and the bearing ring are brought into contact with each other linearly at the three or more locations in the circumferential direction and therefore, stress is distributed both in the circumferential direction and a length direction of the contact portions and deformation of the bearing ring can be avoided by effectively distributing stress.

It is necessary that the contact portions are arranged at the three or more locations. In the case of two locations stress supplied on the bearing ring is concentrated in a predetermined direction and the bearing ring is warped into an elliptical shape.

It is preferable that the contact portions are arranged at equal intervals in the circumferential direction at at least either one of the inner peripheral face portion of the bearing ring and the outer peripheral face portion of the shaft portion of the rotor member. The reason is that the bearing ring is brought into contact with the shaft portion of the rotor member by substantially uniform force with no deviation over the total in the circumferential direction, the stress is evenly distributed substantially uniformly over the total in the circumferential direction and deformation of the bearing ring can be avoided with certainty.

Further, it is preferable that the contact portions are arranged at the inner peripheral face portion of the bearing ring or the outer peripheral face portion of the fixing portion of the shaft portion over an entire length in the axial direction. Stress is distributed substantially uniformly over the total in the axial direction, thereby, deformation of the bearing ring can further be avoided.

Although the contact portions need to form linearly, the contact portions may be formed in a linear shape, a meandering shape or a curved shape. In this case, "linearly" signifies that when the shaft portion of the rotor member is inserted into the bearing member, in the case in which the contact portions are pressed to the opposed member, the width of the contact portions becomes slender to a degree by which the contact portions are deformed by press force and are brought into close contact with the other. Accordingly, the contact portions include those in a slender strip shape having a width to some degree.

Further, the contact portion may be formed such that a distance between the contact portion and the other is smaller than that of the surrounding of the contact portion and the shape is restricted in view of a relationship with each other. Accordingly, at the outer peripheral face portion of the fixing portion of the shaft portion or the inner peripheral face portion of the bearing ring having the contact portions, the contact portions may not be necessarily formed to project outwardly more than the surroundings of the contact portions. For example, in the case in which the section in the radial direction of the inner peripheral face of the bearing ring is formed in an n-angular shape and the section in the radial direction of the outer peripheral face of the fixing portion of the shaft portion is formed in a circular shape, respective central portions in the radial direction of n of plane portions constituting the inner peripheral face of the bearing ring are disposed on planes the same as those in the surroundings, the central portions are formed to be more proximate to the outer peripheral face of the bearing ring than the surroundings to thereby constitute the contact portions and the plane portions from the central portions to corner portions on both sides constitutes the separated portions separated from the bearing ring.

According to the motor of the invention, the fixing portion of the shaft portion is formed in a shape of a circular cylinder, the inner vacant portion of the bearing ring is formed substantially in a shape of a polygonal cylinder coaxial with the bearing ring, the substantially central portions among corner portions of the inner peripheral face portion forming the inner vacant portion of the bearing ring can form the contact portions and the plane portions from the substantially central portions to the corner portions on the both sides can form the separated portions.

According to the motor of the invention, the fixing portion of the rotor member is formed in a shape of a circular cylinder, the bearing ring is provided with teeth-like portions projected inwardly over the axial direction at plural locations of three or more locations of the inner peripheral face portion forming the inner vacant portion, the teeth-like portions of the bearing ring can form the contact portions and the separated portions can be formed by other than the plural locations in the inner peripheral face portion.

According to the motor of the invention, the inner vacant portion of the bearing ring is formed in a shape of a circular cylinder, the fixedly attached portion of the shaft portion is formed substantially in a shape of a polygonal cylinder, edge portions thereof can form the contact portions and the plane portions among the edge portions can form the separated portions.

According to the motor of the invention, the inner vacant portion of the bearing ring is formed in a shape of a circular cylinder, the fixed attached portion of the shaft portion is provided with teeth-like portions projected outwardly over the axial direction at plural locations of the outer peripheral face portion, the teeth-like portions can form the contact portions and the separated portions can be formed by other than the plural locations in the outer peripheral face portion.

Further, the invention achieves the above-described object by providing a method of fabricating a motor comprising a bearing ring fixing step of fixing a bearing ring to a fixedly attached portion of a shaft portion in a state in which contact portions of the bearing ring are brought into contact with the fixedly attached portion of the shaft portion by press-fitting or shrinkage-fitting the fixedly attached portion of a rotor member having the shaft portion formed with the fixedly attached portion in a circular cylindrical shape having a diameter larger than a diameter of a circumference including free edge end portions of the contact portions to an inner vacant portion of the bearing ring having the contact portions projected inwardly and linearly from three or more locations in a circumferential direction of an inner peripheral face portion forming the inner vacant portion, an electromagnet fixing step of arranging a plurality of electromagnets to a supporting member to thereby form a rotary magnetic field coaxially with the supporting member having a hollow portion, a magnet fixing step of fixing rotor magnets to the rotor member so as to be urged by the rotary magnetic field formed by the electromagnets, and a bearing ring containing step of containing the bearing ring in the hollow portion of the supporting member.

The above-described motor according to the invention can be fabricated by the method of fabricating the motor.

Further, the invention achieves the above-described object by providing a method of fabricating a motor comprising a bearing ring fixing step of fixing a bearing ring to a fixedly attached portion of a shaft portion in a state in which contact portions of the shaft portion are brought into contact with an inner peripheral face portion of the bearing ring by press-fitting or shrinkage-fitting the fixedly attached portion of a rotor member having the shaft portion including the fixedly attached portion formed with the contact portions projected outwardly and linearly from three or more locations in a circumferential direction to an inner vacant portion of the bearing ring having the inner vacant portion in a circular cylinder shape having a diameter smaller than a diameter of a circumference including free edge end portions of the contact portions, an electromagnet fixing step of arranging a plurality of electromagnets to the supporting member in a fixed state so as to form a rotary magnetic field coaxial with the supporting member having a hollow portion, a magnet fixing step of fixing rotor magnets to the rotor member so as to be urged by the rotary magnetic field formed by the electromagnets, and a bearing ring containing step of containing the bearing ring in the hollow portion of the supporting member.

The above-described motor according to the invention can be fabricated by the method of fabricating the motor.

Further, the invention achieves the above-described object by providing a rotary apparatus having the motor according to the invention.

DETAILED DESCRIPTION OF THE PREFERRED EMBODIMENTS

A detailed explanation will be given of embodiments of the invention in reference to the drawings as follows.

Figure 1:
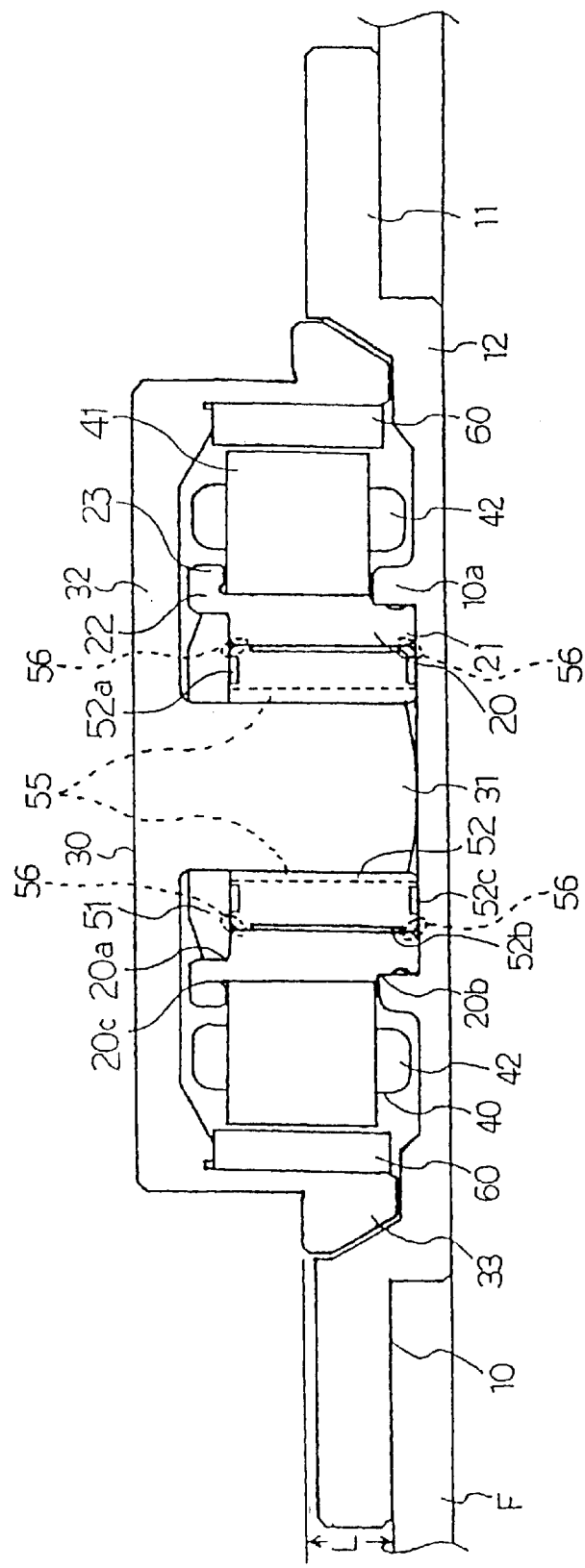
FIG. 1 is a sectional view in an axial direction showing an embodiment of a motor according to the invention.

FIG. 1 is a sectional view in an axial direction showing an embodiment of a motor according to the invention.

The motor according to the embodiment is used in hard disk drive (HDD) and is provided with a base 10 formed with a fitting portion 10a at its center, a sleeve (supporting member) 20 in a shape of a circular cylinder and a hub shaft (rotor member) 30 rotating while supporting a hard disk as shown by FIG. 1.

The base 10 is provided with a bottom portion 12 in a circular plate shape and a flange portion 11 extended from the bottom portion 12 outwardly in the diameter direction while being elevated higher than the bottom portion 12 by one stage to thereby form a peripheral edge portion of the base 10. The fitting portion 10a projected in a circular ring shape is formed at the center of the bottom portion 12.

Further, the bottom portion 12 of the base 10 is mounted to a mounting hole formed at a frame F of HDD and the flange portion 11 is fixed in a state in which the face of the flange portion 11 is brought into contact with the frame F of HDD.

According to the sleeve 20, both of an outer peripheral face and an inner peripheral face thereof are provided with sections in the radial direction in a circular shape over an entire length in the axial direction and a shape of a hollow circular cylinder having different inner diameter and outer diameter is build up in the axial direction.

Further, one end portion 21 of the sleeve 20 is fixed to the base 10 by an adhering agent at the fitting portion 10a of the base 10 and other end side thereof is erected upwardly (side opposed the base 10) and forms a hollow portion opened upwardly.

The other end portion of the sleeve 20 constitutes a large diameter portion 22 having a widened diameter and with a change in the diameter, there are formed stepped portions (first stepped portion 20a and second stepped portion 20b) at respectives of an inner peripheral wall and an outer peripheral wall of the sleeve 20. Further, an upper edge end portion of the other end portion is thickened outwardly in the diameter direction to thereby form a coil locking edge 23 and in accordance with a change in the thickness, there is formed a stepped portion (third stepped portion 20c) at the outer peripheral wall.

Further, a stator coil 40 is fixed coaxially from outside in the radius direction to the large diameter portion 22 of the sleeve 20.

The stator coil 40 constitutes a plurality of electromagnets by a yoke 41 and coils 42 formed by winding lead wires at the yoke 41.

The yoke 41 is provided with a circular ring portion having a circular hole at its center and winding portions extended outwardly in a radius direction from a plurality of locations of the circular ring portion at equal intervals in the circumferential direction and the coils 42 are formed by winding lead wires around the winding portions.

Further, in a state in which the sleeve 20 is inserted into the circular hole of the yoke 41 and the yoke 41 is brought into contact with the third stepped portion 20c of the sleeve 20, an inner peripheral wall of the yoke 41 is fixedly attached coaxially with the sleeve 20. The coils .42 are arranged on a circumference coaxially with the sleeve 20 above the base 10 and a rotary magnetic field is formed by conducting electricity thereto.

Further, at the upper edge end portion of the sleeve 20, one end face of a retaining ring 51 is mounted on the first stepped portion 20a and the outer peripheral wall is fixedly attached to the inner peripheral face of the sleeve 20.

The hub shaft 30 is provided with a shaft portion 31 in a circular cylinder shape, a hub portion (extended portion) 32 in a circular plate shape extended from one end side of the shaft portion 31 and a circular ring portion 33 extended downwardly from a peripheral edge portion of the hub portion 32. Other end portion of the shaft portion 31 constitutes a fixedly attached portion 31b to which the bearing ring 52 is attached.

The hub portion 32 is arranged above an opened upper edge end portion of the sleeve 20 and covers an upper portion of the bottom portion 12 of the base 10.

A peripheral end portion of the circular ring portion 33 (end portion on a side opposed to the hub portion 32) is expanded outwardly and an upper face of the peripheral end portion is lowered from the hub portion 32 by one stage and supports a hard disk.

A plurality of rotor magnets 60 are fixedly attached to an inner peripheral wall of the circular ring portion 33 at equal intervals. The rotor magnets 60 are arranged such that positions of magnetic centers of the rotor magnets 60 in the axial direction are the same as that of a magnetic center of the stator coil 40 and are urged by a rotational magnetic field formed by the stator coil 40.

Figure 2:
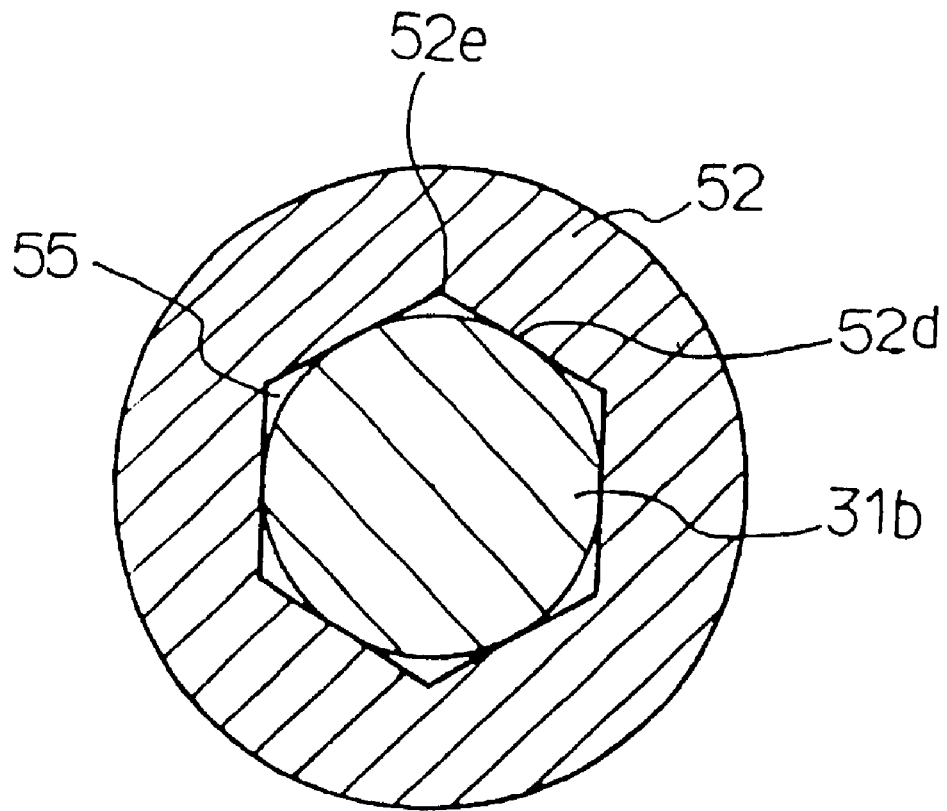
FIG. 2 is a sectional view of essential portions showing a contact state of a shaft portion of a hub shaft and a bearing ring according to the embodiment of FIG. 1.

FIG. 2 is a sectional view of essential portions showing a contact state of the shaft portion 31 of the hub shaft 30 and the bearing ring 52 of the motor according to the embodiment.

As shown in FIG. 2, the bearing ring 52 is formed in a shape of a circular cylinder formed with an inner hollow or vacant portion in a shape of a regular hexagonal cylinder penetrating in the axial direction and an inner peripheral face of the inner vacant portion is formed in a shape in which six planes are connected by side edges of the respective planes. Portions connecting the side edges of the respective planes form edge portions of an inner peripheral face portion of the inner vacant portion.

The fixedly attached portion 31b of the shaft portion 31 of the hub shaft 30 is inserted into the inner vacant portion of the bearing ring 52 and is fixed coaxially with the inner vacant portion. Thereby, substantially central portions among contiguous ones of the edge portions in the inner peripheral face portion of the bearing ring 52, are brought into contact with an outer peripheral face portion of the fixedly attached portion over an entire length along the axial line to thereby constitute contact portions 52d. Respective plane portions form respectives of the contact portions 52d to the edge portions on the both sides, are separated from and opposed to the fixedly attached portion 31b to thereby constitute separated portions 52e. Further, lubricating gaps or oil paths 55 are formed by clearances formed between the separated portions 52e of the bearing ring and the fixedly attached portion 31b of the shaft portion 31.

As shown by FIG. 1, an outer peripheral face of the bearing ring 52 is formed with grooves (two rows of grooves in a skewed line shape) 52a for generating dynamic pressure in the radial direction. Further, grooves (herringbone grooves) 52b and 52c for generating dynamic pressure in the thrust direction are formed at an upper end edge and a lower end edge of the bearing ring 52.

Further, the shaft portion 31 is inserted into the retaining ring 51, the other end portion side of the shaft portion 31 is arranged at a hollow portion of the sleeve 20 along with the bearing ring 52 and the bearing ring 52 is brought into contact with the retaining ring 51 from the hollow portion side of the sleeve 20 to thereby restrict shift of the shaft portion 30 in the axial direction. Oil is filled at respective clearances between the bearing ring 52 and the retaining ring 51, between the bearing ring 52 and the sleeve 20 and one end face of the shaft portion 31 and the sleeve 20. Further, the oil is filled also at clearances formed between the separated portions 52e of the bearing ring 52 and the fixedly attached portion 31b of the shaft portion 31 (oil path 55).

Further, when the hub shaft 30 is rotated, by the grooves 52a, 52b and 52c for generating dynamic pressure, respectively between the outer peripheral face of the bearing ring 52 and the inner peripheral face of the sleeve 20, between the lower end face of the bearing ring 52 and the one end face of the sleeve 20 and between the upper end face of the bearing ring 52 and the lower end face of the retaining ring 51, the oil is drawn, the dynamic pressure is generated and the bearing ring 52 is supported to float in a state in which very small clearances are produced between the bearing ring 52 and the inner peripheral face of the sleeve 20, the one end face of the sleeve 20 and the lower end face of the retaining ring 51.

According to the motor of the embodiment having the above-described constitution, when the rotational magnetic field is generated at the stator coil 40 by conducting electricity thereto, the rotor magnets 60 are urged by the rotational magnetic field and the hub shaft 30 is rotated.

Further, when by the rotation, the oil is drawn to the dynamic pressure generating grooves 52a, 52b and 52c to thereby generate the dynamic pressure and the rotation is at predetermined speed or higher, the bearing ring 52 and the shaft portion 31 are supported in a state of producing the very small clearances between the bearing ring 52 and the shaft portion 31 and the inner peripheral face of the sleeve 20, the one end face of the sleeve 20 and the lower end face of the retaining ring 51, respectively, and the hub shaft 30 and the bearing ring 52 are rotated in a floating state.

During the rotation of the hub shaft 30, the oil between the bearing ring 52 and the sleeve 20 is drawn toward substantially central portions between inner edges and outer edges of respective end faces by the herringbone grooves 52b and 52c formed at the upper end face and the lower end face of the bearing wing 52. Further, the oil is drawn toward a thickness direction of the bearing ring 52 by two rows of grooves in a skewed line shape 52a formed at the outer peripheral face of the bearing ring 52. Therefore, the oil at boundary portion surroundings 56 between the upper and the lower respective end faces and the outer peripheral face of the bearing ring 52 is decompressed. According to a fluid bearing of the conventional technology, by decompressing the oil at the boundary portion surroundings 56, gas components dissolved in the oil are gasified and gas bubbles are produced, which amounts to a deterioration in the rotational accuracy. However, according to the embodiment, the separated portions 52e of the bearing ring 52 and the shaft portion 31 of the hub shaft 30 are separated from each other over the entire length in the axial direction to thereby form the oil paths 55 which are filled with the oil and accordingly, in rotating the motor, the oil filling the oil paths 55 is drawn to the upper and lower respective end faces of the ring 52. Therefore, decompression at the boundary portion surroundings 56 between the upper and the lower respective end faces and the outer peripheral face of the bearing ring 52 is reduced, gasification of the gas components dissolved in the oil is difficult to cause by the decompression and gas bubbles can be avoided from being produced.

Next, an explanation will be given of a method of fabricating a motor according to the above-described embodiment which is an embodiment of a method of fabricating a motor according to the invention.

The motor according to the above-described embodiment is fabricated by the following steps.

That is, firstly, the base 10, the sleeve 20, the hub shaft 30, the yoke 41, the retaining ring 51 and the bearing ring 52 are machined to form.

In this case, the inner vacant portion of the bearing ring 52 is formed in a shape of a regular hexagonal cylinder and a distance between the respective plane constituting the inner peripheral face and the opposed face becomes slightly smaller than a diameter of the fixedly attached portion 31b of the hub shaft 30. Further, at the same time, the grooves 52a, 52b and 52c for generating dynamic pressure are formed at the outer peripheral face and the upper and lower respective end faces of the bearing ring 52. Further, an inner diameter of the sleeve 20 is formed slightly larger than an outer diameter of the bearing ring 52.

Next, the stator coil 40 is formed by winding lead wires at the yoke 41.

Successively, the sleeve 20 is inserted into the circular hole of the yoke 41 of the stator coil 40 and the yoke 41 is brought into contact with the third stepped portion 20c of the sleeve 20. Further, under the state, the inner peripheral face of the yoke of the stator coil 40 is fixed to the sleeve 20. The fixing operation can be carried out by using a conventional method such as press fitting, shrinkage fitting, fixing by an adhering agent with no limitation.

Further, the rotor magnets 60 are fixed from an inner side in the radius direction to the circular ring portion 33 of the hub shaft 30.

Further, the bearing ring 52 and the retaining ring 51 are arranged at the hollow portion of the sleeve 20, the shaft portion 31 of the hub shaft 30 is inserted into the hollow portion of the retaining ring 51 and the fixedly attached portion 31b of the shaft portion 31 is press-fitted to the inner vacant portion of the bearing ring 52. Further, the outer peripheral wall of the retaining ring 51 is fixed to the sleeve 20.

Thereby, the substantially central portions in the radial direction of the respective plane portions constituting the inner peripheral face of the bearing ring are brought into contact with the fixedly attached portion 31b of the shaft portion 31 to be pressed to widen in the circumferential direction and are brought into press contact with the outer peripheral face of the fixedly attached portion 31b over the entire length in the axial direction (contact portions 52d) and the bearing ring 52 is fixed to the fixedly attached portion 31b. Portions of the inner peripheral face portion of the bearing ring 52 other than the substantially central portions are separated from and opposed to the outer peripheral face of the shaft portion 31 (separated portions 52e).

At this occasion, a position of the bearing ring 52 relative to the shaft portion 31 in the axial direction, is adjusted and fixed such that respective magnetic centers of the stator coils 40 fixed to the sleeve 20 and the rotor magnets 60 fixed to the hub shaft 30 coincide with each other.

At the same time, the oil is filled at the respective clearances between the bearing ring 52 and the retaining ring 51, between the bearing ring 52 and the sleeve 20 and between the one end face of the shaft portion 31 and the sleeve 20.

Further, one end portion of the sleeve 20 is fixed to the inserting portion l0a of the base 10 to thereby finish the motor according to the embodiment. The fixing operation can be carried out by using a conventional method such as press fitting, shrinkage fitting, fixing by an adhering agent with no particular limitation.

According to the motor of the embodiment fabricated by the method of fabricating the motor according to the embodiment as described above, the inner peripheral face portion of the bearing ring 52 is formed in the regular hexagonal shape in view of the axial direction and at the sixth locations at equal intervals in the circumference, there are constituted the contact portions 52d projected by shortening the distance from the axis line over the entire length in the axial direction. Further, when the sleeve 20 is inserted into the yoke 10 by press fitting, the substantially central portions in the radial direction of the six plane portions constituting the inner peripheral face portion (contact portions 52d) are crushed in accordance with the shape of the outer peripheral wall of the shaft portion 31 to press to widen to deform by a very small amount and are brought into close contact with the outer peripheral face of the shaft portion 31 with no clearance therebetween. Portions of the inner peripheral face portion of the bearing 52 other than portions in contact with the shaft portion 31 are separated from and opposed to the sleeve 20.

As a result, the bearing ring 52 is brought into contact with the outer peripheral face of the shaft portion 31 at the contact portions 52b with certainty. Therefore, according to the embodiment, stress caused by press fitting can be distributed at the contact portions 52d with certainty. Further, the distributed stress can be received by the contact portions 52d, no influence is effected at the outer peripheral face portion of the bearing ring 52 and the deformation of the outer peripheral face portion can be avoided. Therefore, according to the embodiment, dynamic pressure having a predetermined magnitude can be produced with certainty, the hub shaft 30 can be rotated with excellent rotational accuracy and wear of members can be avoided.

Particularly, according to the embodiment, the contact portions 52d are formed over the entire length in the axial direction of the bearing ring 52 and accordingly, stress is distributed evenly in the axial direction and the deformation of the bearing ring can be avoided excellently.

Further, according to the embodiment, the contact portions 52d are arranged at equal intervals in the circumferential direction and accordingly, stress is distributed substantially evenly also in the circumferential direction and the deformation of the bearing ring can be avoided excellently.

According to the embodiment, the oil paths 55 penetrating in the axial direction are formed by the shaft portion 31 and the separated portions 52e of the bearing ring 52, oil enters the oil paths 55 and accordingly, the oil which have entered the oil paths 55 is turned to decompressed portions in rotating the motor, decompression at the boundary portions between the upper and lower respective end faces and the outer peripheral face of the bearing ring 52 is reduced and gasification of gas components dissolved in the oil by the decompression is restrained. Therefore, gas bubbles can be avoided to produce without particularly providing circulation holes or circulation grooves for circulating the oil drawn by the grooves 52a, 52b and 52c for generating the dynamic pressure at the bearing ring 52.

Next, an explanation will be given of a rotary apparatus adopting the above-described motor as an embodiment of a rotary apparatus according to the invention.

Figure 3A:
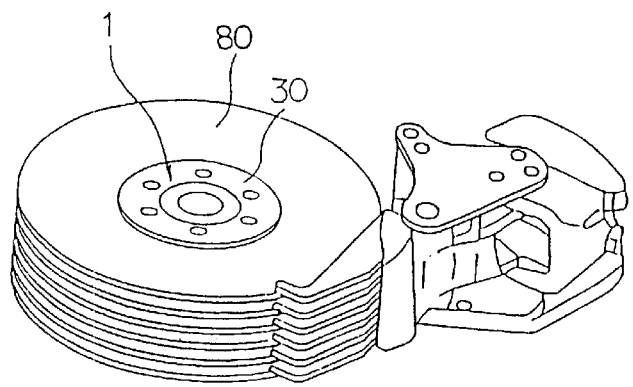
FIG. 3A is a perspective view of an outline constitution of essential portions showing an embodiment of a rotary apparatus according to the invention.
Figure 3B:
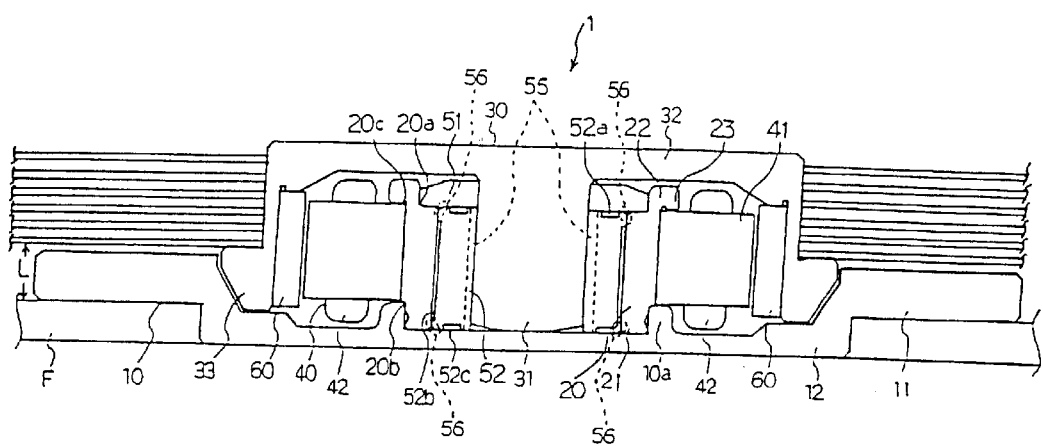
FIG. 3B is a sectional view of an outline of essential portions showing the embodiment of the rotary apparatus according to the invention.

FIGS. 3A and 3B are views showing a hard disk drive according to an embodiment of a rotary apparatus of the invention in which FIG. 3A is a perspective view and FIG. 3B is a sectional view in an axial direction.

As shown by FIGS. 3A and 3B, the rotary apparatus (hard disk drive) is provided with a motor 1 according to the embodiment, as described above, and the base 10 of the motor 1 is fitted and fixed to the frame F of the hard disk drive. Further, a hard disk 80 is supported by the peripheral edge portion of the hub shaft 30 and is rotated along with the hub shaft 30.

According to the hard disk drive of the embodiment, the hub shaft 30 for carrying and rotating the hard disk is rotated with excellent rotational accuracy and accordingly, also with regard to a disk having a large recording density, writing or reading can be executed with high reliability.

Further, the invention is not limited to the above-described embodiment but can be modified pertinently so far as the gist of the invention is not deviated.

Figure 4:
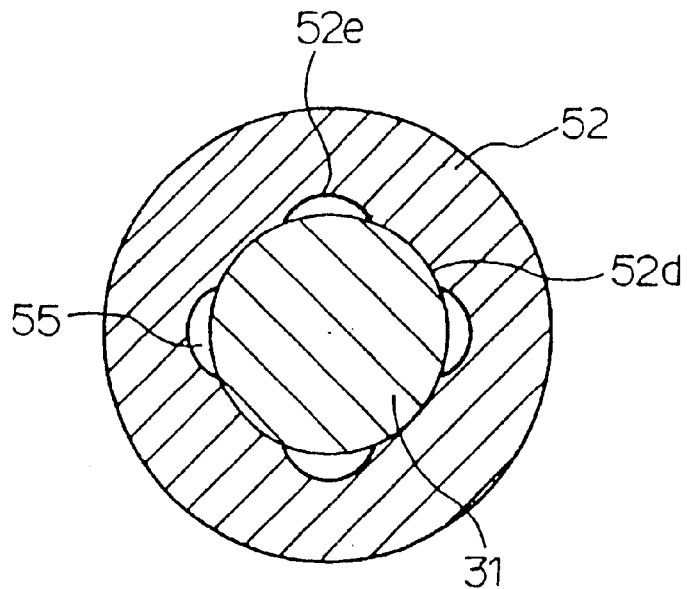
FIG. 4 is a sectional view of essential portions of other embodiment of a motor according to the invention and is a view in correspondence with FIG. 2.

For example, although according to the above-described embodiment, the inner vacant portion of the bearing ring 52 is formed in a regular polygonal shape and the substantially central portions in the circumferential direction of the six respective planes forming the inner peripheral face of the inner vacant portion are brought into contact with the outer peripheral face portion of the shaft portion 31 to thereby constitute the contact portion 52d, the shapes of the inner vacant portion and the contact portions 52d are not limited thereto but, for example, as shown by FIG. 4, there may be provided teeth-like portions projected inwardly at three or more locations in the circumferential direction of the inner peripheral face portion of the bearing ring 52 over the axial direction, the teeth-like portions may be brought into contact with the outer peripheral face of the shaft portion 31 to thereby constitute the contact portions 52d and the separated portions 52e separated from and opposed to the outer peripheral face portion of the shaft portion 31 may be constituted by other than portions of the inner peripheral base portion projected with the teeth-like portions.

In this case, the motor is fabricated by machining to form the bearing ring 52 and the hub shaft 30 such that a diameter including free edge end portions of the teeth-like portions of the bearing ring 52 becomes slightly smaller than that of the outer peripheral face portion of the one end portion of the shaft portion 31 and fixing the shaft portion 31 of the hub shaft 30 to the inner vacant portion of the bearing ring 52 by press fitting.

Figure 5:
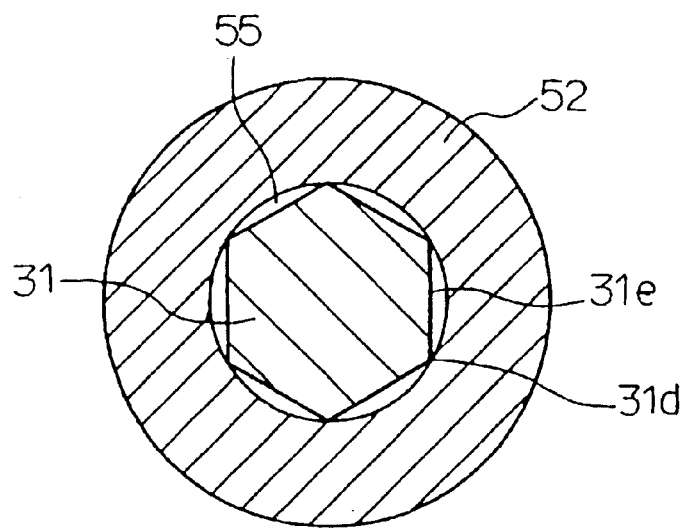
FIG. 5 is a sectional view of essential portions of other embodiment of a motor according to the invention and is a view in correspondence with FIG. 2.
Figure 6:
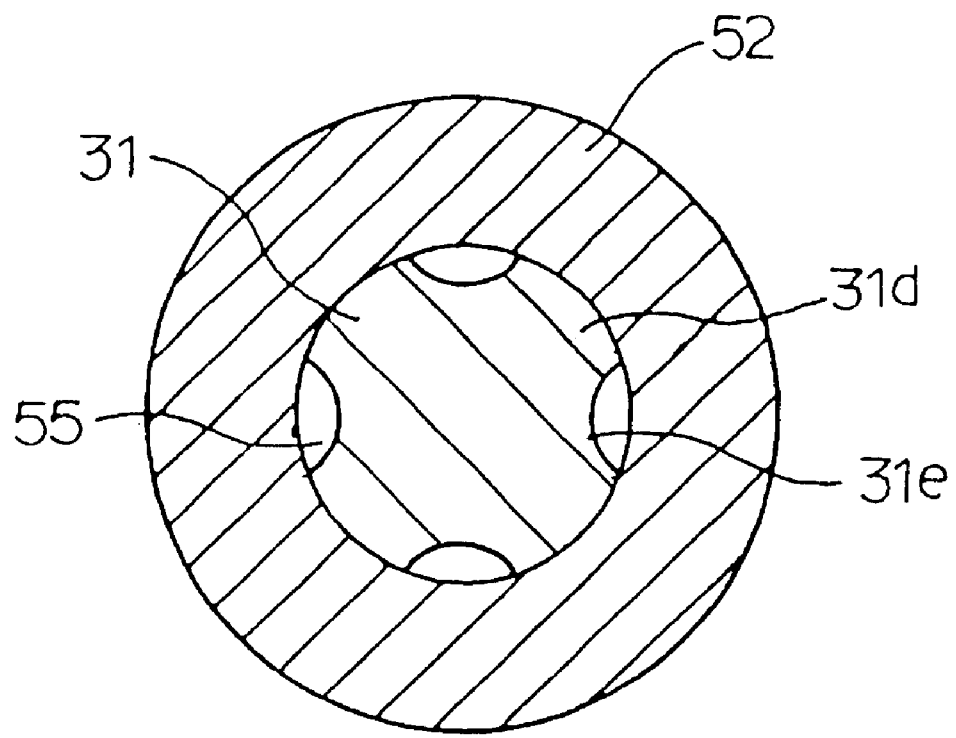
FIG. 6 is a sectional view of essential portions of other embodiment of a motor according to the invention and is a view in correspondence with FIG. 2.
Figure 7:
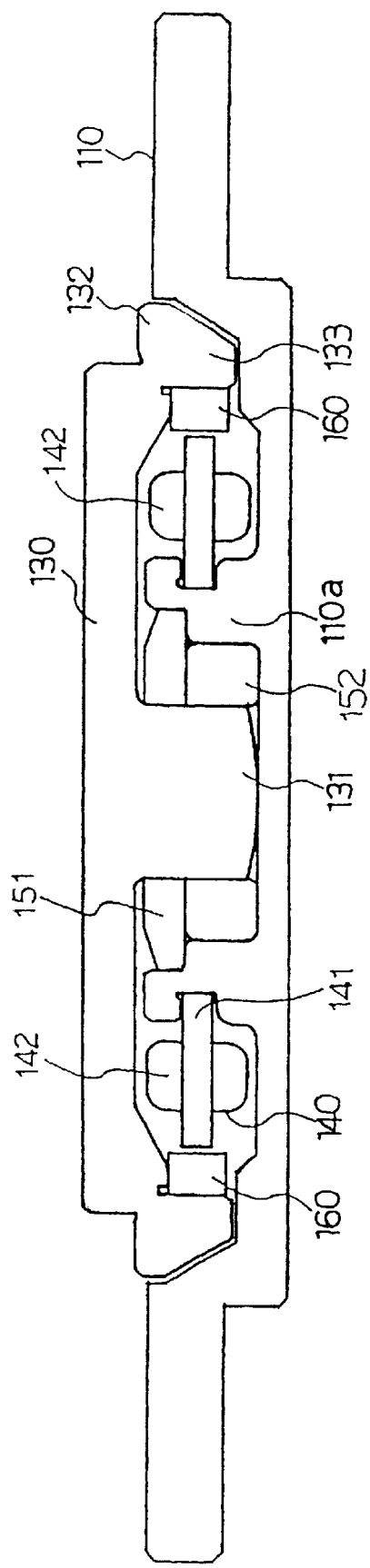
FIG. 7 is a sectional view in an axial direction showing a motor according to a conventional technology.

Further, the contact portions and the separated portions may not be arranged to the bearing ring 52 but may be formed at the outer peripheral face portion of the shaft portion 31. For example, as shown by FIG. 5, the inner vacant portion of the bearing ring 52 may be formed in a circular cylinder shape, the fixedly attached portion 31b of the shaft portion 31 may be formed in a shape of a regular polygonal cylinder, edge portions of the fixedly attached portion 31b may be brought into contact with the inner peripheral face portion of the bearing ring 52 as the contact portions 31d and plane portions among the edge portions may be separated from and opposed to the bearing ring 52 as the separated portions 31e. Further, as shown by FIG. 6, there may be formed teeth-like portions projected outwardly in the diameter direction from plural locations of three or more locations in the circumferential direction of the outer peripheral portion of the fixedly attached portion 31b of the shaft 31 over the entire length in the axial direction and the teeth-like portions may be brought into contact with the inner peripheral face portion of the base 10 as the contact portions 31d by press-fitting the shaft portion 31 to the inner vacant portion of the bearing ring 52 and portions of the outer peripheral face portion other than at the plural locations may be separated from and opposed to the inner peripheral face portion of the base 10 as the separated portions 31e.

In the case in which the contact portions 31d and the separated portions 31e are formed at the outer peripheral face portion of the fixedly attached portion 31b of the shaft portion 31 in this way, the motor can be fabricated by machining to form the hub shaft 30 and the bearing ring 52 such that the diameter including the contact portions 31d is made slightly larger than the inner diameter of the bearing ring 52 and fixing the bearing ring 52 to the shaft portion 31 of the hub shaft 30 by press fitting.

It is preferable in view of effectively distributing stress in the axial direction that the contact portions 31d or 52d and the separated portions 31e or 52e are arranged over the entire length in the axial direction at the opposed portions where the shaft portion 31 and the bearing ring 52 are opposed to each other.

Although according to the above-described embodiments, the bearing ring 52 is fixedly inserted into the shaft portion 31 by press fitting, the invention is not limited thereto but the bearing ring 52 and the shaft portion 31 can be formed by materials having different expansion coefficients and shrinkage fitting can be constituted by utilizing a difference between the expansion coefficients.

Although according to the above-described embodiments, the contact portions 52d are formed at six locations in the radial direction section, the invention is not limited thereto. However, when a number of the contact portions 52d is excessively large in the radial direction section, depending on contact force between the bearing ring 52 and the shaft portion 31 after press fitting, the force exerted to the contact portions 52d becomes excessively small, the contact portions 52d are not pressed to crush, there is a concern of not achieving the effect of bringing the contact portions 52d into contact with the other side evenly and accordingly, it is preferable that the number is equal to or smaller than 20 locations in the radial direction section.

Further, although according to the above-described embodiments, the sleeve 20 functioning as a portion of receiving means for generating the dynamic pressure along with the bearing ring 52, support the electromagnets, these may be arranged at separate members.

The rotor magnets 60 may be permanent magnets or electromagnets. Further, a plurality of magnets may be fixed to the inner peripheral wall of the hub shaft 30 or a single magnet in a cylindrical shape having radial anisotropy may be fixed to the inner peripheral wall of the hub shaft 30.

Although according to the above-described embodiments, the dynamic pressure generating means are constituted by the grooves 52a, 52b and 52c for generating the dynamic pressure, in place of the grooves, a plurality of segments may be arranged to the bearing ring 52 or the sleeve 20.

Further, the shape of the grooves 52a, 52b and 52c for generating the dynamic pressure is not limited to the above-described but, for example, as the groove 52a for generating the dynamic pressure, in place of the groove in the skewed line shape, there may be formed a groove having a shape of a spiral groove, a herringbone groove or the like. Further, as the grooves 52b and 52c for generating the dynamic pressure, in place of the herringbone groove, there may be formed a groove having various shapes of spiral groove or the like.

Although according to the above-described embodiments, the oil is filled as a fluid for generating the dynamic pressure between the bearing ring 52 and the sleeve 20, the invention is not limited thereto but air or water may be used. In the case of an air bearing using air, in comparison with oil or water, the clearance needs to set by a very small amount and accordingly, influence of deformation of the bearing is liable to effect and the invention is particularly effective.

Although the motor according to the above-described embodiments is of an outer rotor type in which the rotor magnets 60 are arranged outward from the stator coil 40 in the radius direction, the invention is not limited thereto but the motor may be of an inner rotor type. Further, the motor can be constituted by a motor not of a radial gap type but of an axial gap type. However, in these cases, for example, it is necessary to change shapes of respective members or add members such that a first peripheral wall fixed with electromagnets and a second peripheral wall for generating dynamic pressure between the sleeve 20 and the bearing ring 52 are arranged to the sleeve 20.

Further, in the specification, "rotation" in the case of rotating the rotor member or the bearing ring, signifies relative rotation relative to the base or the sleeve. Therefore, the invention includes a motor and a rotary apparatus having the motor in which the hub portion 32 of the rotor member 30 is fixed to an outside member, the rotor member 30 is fixed to an outside member and the sleeve 20 is rotated relative to the outside.

Although according to the above-described embodiments, the hard disk apparatus supports and rotates a plurality of sheets of disks, the hard disk apparatus can support and rotate only one sheet of the disk.

Although in to the above-described embodiments the rotary apparatus is constituted by the hard disk drive, the invention is not limited thereto but may be other types of disk drives, such as CD-ROM drive, for example, a rotary polygonal face mirror apparatus constituted by attaching polygonal mirrors to a spindle of a spindle motor or other apparatus.

As has been explained, according to the motor of the invention, at at least either of the inner peripheral face portion of the bearing ring having the inner vacant portion and the outer peripheral face portion of the shaft portion of the rotor member inserted into and fixed by the bearing ring, the contact portions projected linearly to other thereof are formed at three or more locations in the circumferential direction interposing the separated portions and accordingly, when the shaft portion is fixed to the bearing ring by press fitting, the contact portions are crushed in accordance with the shape of the other and are brought into contact with the other with certainty. Therefore, stress caused by fixing the bearing ring is distributed and absorbed by the contact portions with certainty, the deformation of the bearing ring can be avoided, the predetermined dynamic pressure can be generated in rotational operation with certainty and excellent rotational accuracy and high durability can be achieved.

According to the method of fabricating the motor of the invention, the deformation of the bearing ring can be avoided, the predetermined dynamic pressure can be generated in the rotational operation with certainty and excellent rotational accuracy and high durability can be achieved.

According to the rotary apparatus of the invention, by providing the motor according to the invention, the deformation of the bearing ring can be avoided, the predetermined dynamic pressure can be generated in rotational operation with certainty and excellent rotational accuracy and high durability can be achieved.

What is claimed is:

1. A motor comprising:
   a rotor member having a shaft portion supported for rotation;
   a bearing ring having an inner hollow portion connected to the shaft portion for rotation therewith;
   a support member having a hollow portion rotatably supporting the bearing ring;
   a plurality of electromagnets connected to the support member in coaxial relation thereto for generating a rotational magnetic field;
   a plurality of rotor magnets connected to the rotor member in confronting relation to the electromagnets so that the rotational magnetic field generated by the electromagnets coacts with the rotor magnets to rotate the rotor member and the bearing ring; and
   dynamic pressure generating means disposed at one of the bearing ring and the support member for generating dynamic pressure between the bearing ring and the support member during rotation of the bearing ring;
   wherein at least one of an outer peripheral face of the shaft portion to which the bearing ring is connected and an inner peripheral face of the hollow portion of the bearing ring has contact portions projected linearly towards and in contact with the other of the outer peripheral face and the inner peripheral face at three or more locations in a circumferential direction thereof so that separated portions are formed between the contact portions and are disposed opposite to portions of the outer peripheral face and the inner peripheral face which do not contain the contact portions.

2. A motor according to claim 1; wherein the outer peripheral face of the shaft portion has a generally circular cylinder shape; wherein the hollow portion of the bearing ring has a generally polygonal cylinder shape having corner portions and a plurality of central portions each disposed between an adjacent pair of the corner portions; and wherein the central portions of the bearing ring form the contact portions, and plane portions disposed proximate the corner portions and on opposite sides of the central portions form the separated portions.

3. A rotary apparatus comprising: a motor according to claim 2; and an object mounted on the rotor member of the motor for rotation therewith.

4. A motor according to claim 1; wherein the shaft portion of the rotor member has a generally circular cylinder shape; and wherein the bearing ring has at least three teeth-like portions projecting from the inner peripheral face to form the contact portions, the separated portions being formed by portions of the inner peripheral face other than the teeth-like portions.

5. A rotary apparatus comprising: a motor according to claim 4; and an object mounted on the rotor member of the motor for rotation therewith.

6. A motor according to claim 1; wherein the inner hollows portion of the bearing ring has a generally circular cylinder shape; and wherein the shaft portion of the rotor member has a generally polygonal cylinder shape having edge portions and a plurality of plane portions each disposed between an adjacent pair of the edge portions, the edge portions forming the contact portions and the plane portions forming the separated portions.

7. A rotary apparatus comprising: a motor according to claim 6; and an object mounted on the rotor member of the motor for rotation therewith.

8. A motor according to claim 1; wherein the inner hollow portion of the bearing ring has a generally circular cylinder shape; and wherein the shaft portion of the rotor member has teeth-like portions projecting from the outer peripheral face, the teeth-like portions forming the contact portions and the separated portions being formed by portions of the outer peripheral face other than the teeth-like portions.

9. A rotary apparatus comprising: a motor according to claim 8; and an object mounted on the rotor member of the motor for rotation therewith.

10. A rotary apparatus comprising: a motor according to claim 1; and an object mounted on the rotor member of the motor for rotation therewith.

11. A motor comprising: a base; a support member connected to the base and having a hollow space; a bearing member mounted in the hollow space of the support member for undergoing rotation, the bearing member having a hollow space having an inner peripheral surface; a rotor member having a shaft portion disposed in the hollow space of the bearing member for rotation therewith, the shaft portion having an outer peripheral surface; at least one magnet connected to one of the support member and the rotor member; and a plurality of electromagnets connected to the other of the support member and the rotor member and in confronting relation to the magnet for generating a rotational magnetic field that coacts with the magnet to rotate the rotor member; wherein at least one of the inner peripheral surface of the bearing member and the outer peripheral surface of the shaft portion of the rotor member has a plurality of contact portions disposed in contact with the other of the inner peripheral surface and the outer peripheral surface to form a plurality of lubricating gaps each disposed between an adjacent pair of contact portions and between the inner and outer peripheral surfaces.

12. A motor according to claim 11; wherein at least a portion of the inner peripheral surface of the bearing member comprises a plurality of generally planar surface portions connected together along peripheral edges thereof, each of the planar surface portions having a respective one of the contact portions; and wherein each of the lubricating gaps is disposed at a respective one of an intersection between the peripheral edges of two adjacent planar surface portions.

13. A motor according to claim 11; wherein at least a portion of the outer peripheral surface of the shaft portion comprises a plurality of generally planar surface portions connected together along peripheral edges thereof to form the contact portions, each of the lubricating gaps being disposed between a respective one of the planar surface portions and the inner peripheral surface of the bearing member.

14. A motor according to claim 11; wherein at least a portion of the inner peripheral surface of the bearing member has a plurality of grooves each confronting the outer peripheral surface of the shaft portion to form a respective one of the lubricating gaps; and wherein each of the contact portions is disposed between a respective adjacent pair of grooves.

15. A motor according to claim 11; wherein at least a portion of the outer peripheral surface of the shaft portion has a plurality of grooves each confronting the inner peripheral surface of the bearing member to form a respective one of the lubricating gaps; and wherein each of the contact portions is disposed between a respective adjacent pair of grooves.

16. A rotary apparatus comprising: a motor according to claim 11; and an object mounted on the rotor member of the motor for rotation therewith.

17. A motor comprising: a base having a fit portion; a support member formed separately from the base and having one end fitted in and connected to the fit portion of the base; a rotor member having a shaft portion supported for rotation relative to and coaxial with the support member; a bearing member disposed between the support member and the shaft portion of the rotor member, at least one of an inner peripheral surface of the bearing member and an outer peripheral surface of the shaft portion having a plurality of contact portions disposed in contact with the other of the inner peripheral surface and the outer peripheral surface to form a plurality of lubricating gaps each disposed between an adjacent pair of contact portions and between the inner and outer peripheral surfaces; at least one magnet connected to one of the support member and the rotor member; and a plurality of electromagnets connected to the other of the support member and the rotor member and in confronting relation to the magnet for generating a rotational magnetic field that coacts with the magnet to rotate the rotor member.

18. A motor according to claim 17; wherein the support member comprises a sleeve having a hollow space, a first end, and a second end disposed in the fit portion of the base; and wherein bearing member is disposed in the hollow space of the support member.

19. A rotary apparatus comprising: a motor as set forth in claim 17; and an object mounted on the rotor member of the motor for rotation therewith.

* * * * *